May 12, 1925.
A. J. MANDRY
1,537,852
FENDER BRACE
Filed Dec. 23, 1924
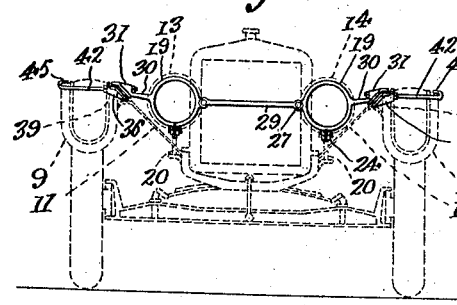
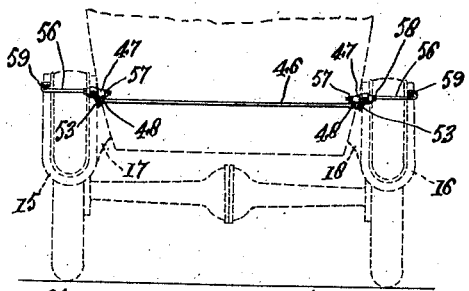
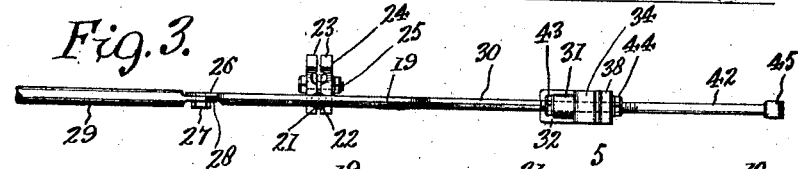
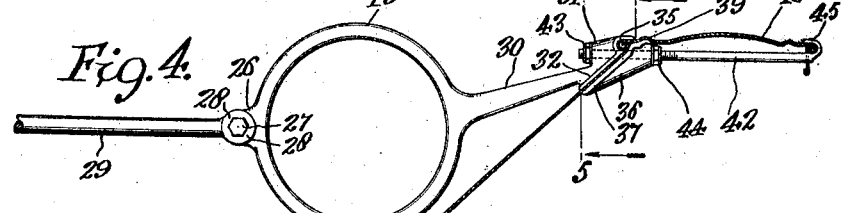
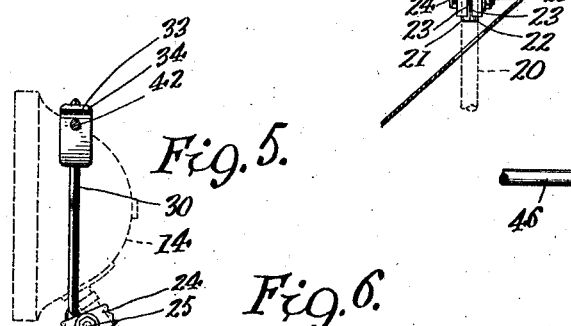
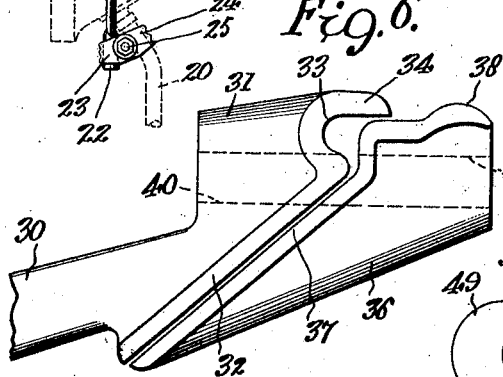
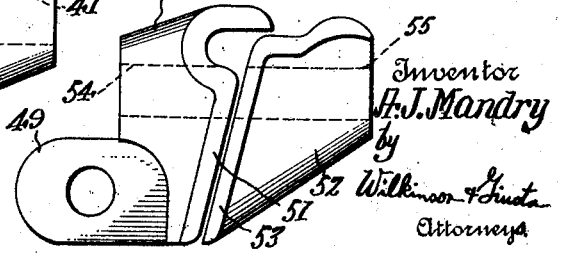
Inventor
A. J. Mandry
by
Wilkinson & Fisher
Attorneys Patented May 12, 1925.

1,537,852

UNITED STATES PATENT OFFICE.

ARTHUR J. MANDRY, OF NEW ORLEANS, LOUISIANA.

FENDER BRACE.

Application filed December 23, 1924. Serial No. 757,719.

*To all whom it may concern:*

Be it known that I, ARTHUR J. MANDRY, a citizen of the United States, residing at New Orleans, in the parish of Orleans and State of Louisiana, have invented certain new and useful Improvements in Fender Braces; and I do hereby declare the following to be a full, clear, and exact description of the invention, such as will enable others skilled in the art to which it appertains to make and use the same.

The present invention relates to improvements in fender braces for automobiles, and has for an object to provide a rigid and ornamental framework for placing both the front and rear fenders of vehicles under tension to avoid their rattling incident to travel.

Another object of the invention resides in providing a strong light device arranged to be easily applied and to avoid rattling not only of the fenders, but also of the lamps and other connected parts.

With the foregoing and other objects in view, the invention will be more fully described hereinafter, and will be more particularly pointed out in the claims appended hereto.

In the drawings, wherein like symbols refer to like or corresponding parts throughout the several views, Figure 1 shows in dotted lines the front view of the automobile with the improved appliance thereon.

Figure 2 shows in dotted lines a fragmentary rear view of the vehicle with the device applied to the rear fenders.

Figure 3 is a fragmentary plan view of the device taken on an enlarged scale.

Figure 4 is an elevation of the same showing the application to one fender.

Figure 5 shows in dotted lines a side view of one of the head lamps with the device applied thereto.

Figure 6 is an enlarged view showing the fender clamps for the front fenders.

Figure 7 is a similar view showing the arrangement of the clamps with the rear fenders, and Figure 8 is an enlarged view showing the application of the device to the rear fender and aprons.

Referring more particularly to the drawings, 9 and 10 indicate in Fig. 1 the front fenders of a Ford automobile, and 11 and 12, the aprons which extend from the fenders down to the channel bars of the chassis. The head lamps are indicated at 13 and 14.

In Fig. 2, the rear fenders of the vehicle are indicated at 15 and 16, and the rear aprons, at 17 and 18. These various parts are standard construction of the present Ford automobile.

In accordance with the invention, rings 19 are made to fit about the casings of the head lamps 13 and 14, these rings being of a size to fit about the intermediate portions of the lamp casings as indicated in Fig. 5, the rings engaging only at the underside of the casing and having a tendency to lift the lamp, thus putting the lamp and its perch 20 under tension to avoid loose play and rattling thereof. The perch is bent forwardly at its upper end where it carries the lamp, and is thus accessible beneath for the application of the ring 19. The ring is split at its lower part, and the opposite split ends are provided with the half pin sections 21 and 22 projecting downwardly and into and between the jaws 23 of the clamp member 24, fitting about the upper bent end of the perch 20. The two jaws of the clamp may be held and drawn together by the clamp bolt 25. Any appropriate clamp may be used for this purpose. The split ends of the ring are drawn apart to permit of the insertion of the ring about the lamp casing and the engagement of the pin sections 21 and 22 about the lamp perch. The rings 19, as clearly shown in Figure 4 are split rings and the pin sections 21 and 22 afford convenient grips whereby the rings may be opened out or enlarged at the split portion to permit this split portion and the pin sections to separate sufficiently to get around the perch 20 for the lamp, the perch being of small diameter. Of course the pin sections may be moved in relatively opposite axial directions with respect to the ring 19 and this also affords convenience in getting around the perches.

Two rings 19 are employed, one to fit about each lamp casing, and these rings are provided at their inner sides with perforated lugs 26 to receive the rivets, bolts or other fastenings 27 also passing through the enlarged perforated heads 28 on the connecting rod 29 between the two rings. This connecting rod extends across in front of the radiator of the vehicle in a horizontal direction substantially coinciding with the center points of the lamps, and it forms a convenient rail to which to affix the license tag.

At the outer sides of the rings 19 are arms 30 projecting diagonally upward and outward toward the edges of the fenders. At the outer free ends, these arms are provided with clamp heads 31 as shown more particularly in Fig. 6, the inner edge 32 of the clamp member being shaped to conform to the upper edges of the aprons and the beaded edges, fenders or mud guards. The cavity 33 provides for receiving the beaded portion, and the edge is continued upwardly as at 34 to overlie the beaded edge and to cross the bead indicated at 35 in Fig. 4 to be entirely embraced by portions of the clamp head 31 and the inner companion clamp member 36. The edge 37 of this inner clamp member is formed as a complement to the outer clamp member and to adjacent inner parts of the apron and fender. The inner clamp member has the raised part 38 for fitting into the depressed inner part beneath the pressed up bead 39 on the fender. The clamp members may be appropriately reinforced and are provided with aligning openings 40 and 41 for the passage of the threaded bolt 42. Nuts 43 and 44 are threaded upon the bolt and take against opposite ends of the two clamp members. The bolt 42 extends across beneath the fender and is provided with a hook 45 extending upwardly and inwardly to grasp about the outer fender bead.

Referring to Figs. 2, 7 and 8, these figures illustrate the application of the device to the rear fenders and inasmuch as there are no head lamps to be braced, the rings 19 are omitted, and a connecting bar 46 extends between the two clamp members indicated at 47. The connecting bar 46 is made with enlarged perforated ends 48, adapted to fit against the flat perforated lugs 49 at the lower inner corners of the clamp members 47. Bolts, rivets or other fastenings 50 are passed through the openings in the heads 48 and lugs 49 for the purpose of securing the two clamp members and to draw the fenders toward one another in order to put the fenders under tension and to take up any loose play therein. The clamp head 47 differs from the clamp head 31 in shape as required by the fact that the rear apron 18 extends down more in a vertical plane than the front aprons, and, consequently the clamp edge 51 is necessarily made to conform to this standard vehicle construction. In a similar manner the other clamp member 52 is provided with a more nearly vertical clamping edge 53 to engage upon the inner side of the apron 18. Through passages 54 and 55 are also made in these clamp members to receive the bolt 56 having the nuts 57 and 58 engaging against opposite faces of the two clamp members. The bolt 56 has a hook 59 on its outer end engaged about the outer side of the rear fender.

In the use of the device, the rings 19 are pushed up against the rear sides of the lamp casings and the lower split ends spread about the perches. The clamps 24 are then put in place, but the split pin sections 21 and 22, and the ring are securely held together therein with the lower parts of the rings fitting up against the lower part of the lamp casings. The two rings are rigidly connected at their inner portions by their connecting rod 29, but at their outer portions, these rings may be pulled outwardly and upwardly by the diagonal arms 30. This pulling is occasioned by the adjustment of the clamp members. By backing off the nut 44 and binding on the nut 43 the arms 30 may be pulled outwardly and upwardly, thus placing the lamp casings under greater tension. This will also draw the two fenders 9 and 10 together and take up any loose play therein so as to avoid rattling. Both the fenders and the aprons will be put under tension, as well as the lamps. After the adjustment is made, the nut 44 is tightened to bind the fender inner edge and apron upper edge tightly in place and to avoid the distortion of the fender and apron by the pressure of the clamp member 31. The nuts 43 and 44 may be adjusted back and forth to give the desired tension and the arrangement permits of the ready application of the device to existing automobile constructions without requiring any alteration therein.

The rear fenders 15 and 16 are braced in the same manner, except that the nuts 57 and 58 act directly and in a line through the bar 46, but the fenders are drawn together in the same manner, and the upper edges of the aprons 17 and 18 and the inner edges of the fenders 15 and 16 are protected by the clamp members fashioned to agree with the conformation thereof.

It is obvious that various changes and modifications may be made in the details of construction and design of the above specifically described embodiment of this invention without departing from the spirit thereof, such changes and modifications being restricted only by the scope of the following claims:

What I claim is:

1. A fender brace for vehicles comprising companion clamps for fitting against the inner beaded edges of the fenders and aprons, said clamp members having opposed clamp surfaces for conforming to the apron and to fit about the bead of the fender, a clamp bolt fitting loosely through said clamp members and engaged about the outer edge of the fender, means extending transversely of the vehicle for coupling rigidly together the inner clamp members of each pair, and nuts on the clamp bolts fitted against opposite faces of the clamp members for adjusting the same along the bolt.

2. In combination with a vehicle having lamp perches, lamps thereon, fenders and fender aprons, rings adapted to fit about said lamps and to engage beneath the same, means for holding said rings upon the lamp perches, means for rigidly connecting the rings about the lamps, outer arms on the rings projecting upwardly and outwardly, clamp members on the arms for fitting against the upper edges of the aprons and about the beaded inner edges of the fenders, companion clamps fitting upon the inner faces of the fenders and aprons, bolts engaged with the outer beaded edges of the fenders and extending through said clamp members and nuts threaded on the bolt for engaging opposite edges of the clamp members.

3. In combination with a vehicle having lamp perches, lamp casings thereon, casing fenders and fender aprons, rings split at their bottom portions for fitting about the lamp casings, split pins extending down from the ring, clamps for holding the split pins together and supported on said perches, a rod for conecting the two rings, diagonal arms projecting from the outer sides of said rings, clamp members at the upper, outer ends of said arms, companion clamp members cooperating with the arm clamp members, bolts having hooks to engage the outer edges of the fenders fitted slidingly through said clamp members, said clamp members adapted to engage upon opposite sides of the aprons and inner beaded edges of the fenders, and nuts threaded upon said bolts and engaging adjustably against opposite faces of said clamp members.

ARTHUR J. MANDRY.